Dec. 16, 1924.
C. E. JONES
INSECT DESTROYER
Filed Feb. 5, 1923
1,519,456
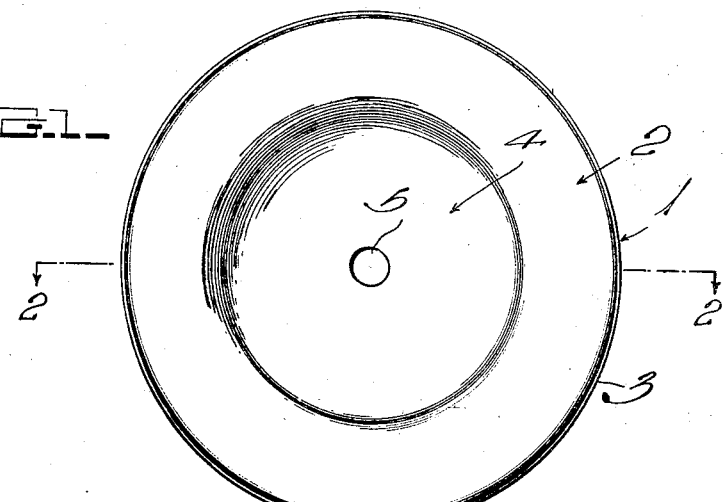
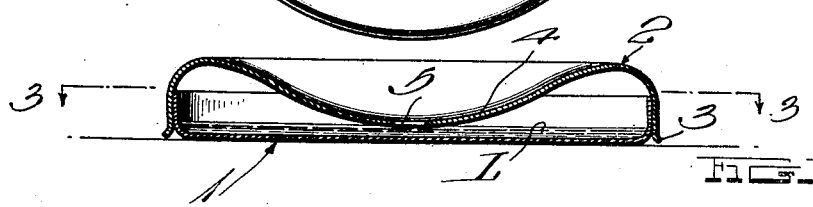
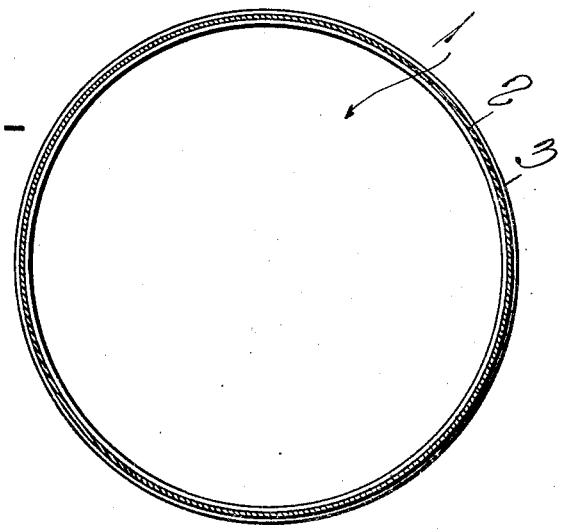
INVENTOR.
C. E. JONES
BY
ATTORNEYS.

Patented Dec. 16, 1924.

1,519,456

UNITED STATES PATENT OFFICE.

CLIFFORD E. JONES, OF PERU, INDIANA.

INSECT DESTROYER.

Application filed February 5, 1923. Serial No. 617,107.

*To all whom it may concern:*

Be it known that I, CLIFFORD E. JONES, a citizen of the United States, residing at Peru, in the county of Miami and State of Indiana, have invented certain new and useful Improvements in Insect Destroyers; and I do declare the following to be a full, clear, and exact description of the invention, such as will enable others skilled in the art to which it appertains to make and use the same.

This invention relates to an improved device which may be specifically termed an insect destroyer or fly killer, and has more particular reference to a device of the class embodying a container which is adapted to hold a poisonous liquid to be administered to the pests who are attracted to and light on it.

Prior patented and marketed devices of this class usually embody a comparatively small container for a quantity of poisonous liquid and the top of the container is provided with openings in which wicks or the like are held so that through capillary attraction, they will become moistened and carry the poison to the exterior of the container to render it accessible to flies and the like. Devices of this particular type are objectionable in one respect, in that the wicks become clogged and covered with dirt to an extent to render them practically useless for the purpose intended. These devices are also objectionable in that they require rather frequent refilling in order to keep the wicks thoroughly moistened. Furthermore, such structures are undesirable in that they render cleaning difficult and impracticable.

In view of the foregoing disadvantages and other objections which accompany devices of the above types, I have conceived and produced a device of extremely simple nature which is such in construction as to overcome the foregoing objections, the device being of such design that it is practical and inexpensive to both the manufacturer and the user.

Another and important feature of applicant's invention is the provision of a container which is made up of a pan for the liquid having a removable cover fitted thereon to facilitate cleaning, the cover having its central portion depressed inwardly and this depressed portion having an opening at its center which is disposed in close spaced proximity to the bottom of the pan to render the liquid visible and accessible at all times.

Another and important result obtained from the structure just outlined resides in the fact that if the container is accidentlly inverted, the liquid contents will not spill out.

Other objects and advantages of the invention will be apparent during the course of the following description.

In the accompanying drawings forming a part of this specification and in which like numerals are employed to designate like parts throughout the same:—

Figure 1 is a top plan view of an insect destroying device constructed in accordance with this invention.

Fig. 2 is a vertical section taken on the line 2—2 of Fig. 1.

Fig. 3 is a horizontal section taken on the line 3—3 of Fig. 2.

As before indicated, the improved device comprises a comparatively shallow pan 1 having a flat bottom adapted to rest approximately throughout its area on a support and having a cylindrical wall rising from said bottom, and which is adapted to contain a small quantity of poisonous liquid L. A removable cover 2 having a depending vertically disposed peripheral flange adapted to be telescopically engaged with the wall of the pan and in order to facilitate such engagement, the depending rim of the cover has its free edge flared outwardly slightly as indicated at 3. As seen, the entire central portion of the cover is depressed inwardly as at 4 and this depressed portion is formed at its center with a relatively small opening 5 disposed in close proximity to the central portion of the bottom of the pan and by means of which the liquid is rendered visible and accessible. As is obvious, it is through this opening 5 that the flies have access to the surface of the liquid and it is only a matter of a few minutes after tasting of it that they are poisoned and die.

In practice, the poisonous liquid may be purchased already mixed and poured into the pan or a powder may be placed in the pan so as to permit water to be mixed with it to form the insecticide. It is preferable to place only a small quantity of liquid in the pan so that it will assume the approximate level indicated in the drawing. Then, only a thin film will be exposed through the opening in the closure. If it is desired however, a greater quantity of liquid can be used and if this is the case, a small pool will form in the bottom of the depression in the closure. After the device is filled for use, it is placed in any convenient place and the flies who taste of the liquid, will, as before stated, be instantly killed.

From the foregoing description it is obvious that I have evolved and produced a unique device which is especially advantageous in that the parts are separable to facilitate cleaning and are of such construction that they prevent spilling of the liquid on table cloths and the like in the event that the container is accidentally inverted. There are no wicks to harden and accumulate foreign matter, nor is there any means to hinder ready filling. The poison liquid is always available and it is within reach of the pests to be poisoned as long as there is any liquid left in the container. Further, the liquid in the container is always visible so that it may be readily ascertained when it is necessary to replenish the used contents. Moreover, it is to be noted that the proportion of parts is such as to permit the pan to telescope sufficiently far into the cover to permit the free edge of the downturned flange of the latter to be disposed in close proximity to the support on which the trap is placed. Hence, in a sense, the flange of the cover serves as a gauge to indicate the distance or space between the depressed portion of the cover and the bottom of the pan. These and other advantages and features of the invention have doubtless been made apparent from the foregoing description and drawing. Hence, a more lengthy description is thought unnecessary.

I claim:—

An insect trap comprising a relatively shallow pan having a flat bottom adapted to rest approximately throughout its area on a support, and a cylindrical wall rising from said bottom, and a removable cover having a depending vertically disposed peripheral flange, portions of said flange being cylindrical and adapted to telescopically engage the wall of said pan, the free edge of said flange being flared outwardly to facilitate application of the cover, and the central portion of said cover being depressed and provided with a relatively small hole adapted to be disposed in close proximity to the central portion of the bottom of the pan.

In testimony whereof I have hereunto affixed my signature.

CLIFFORD E. JONES.